US011827228B2

(12) United States Patent
Takemura et al.

(10) Patent No.: US 11,827,228 B2
(45) Date of Patent: Nov. 28, 2023

(54) ROAD ABNORMALITY DETECTION APPARATUS, ROAD ABNORMALITY DETECTION METHOD AND ROAD ABNORMALITY DETECTION PROGRAM

(71) Applicant: TOYOTA JIDOSHA KABUSHIKI KAISHA, Toyota (JP)

(72) Inventors: Kazuaki Takemura, Nagoya (JP); Makoto Matsushita, Ichinomiya (JP); Tae Sugimura, Miyoshi (JP); Hideo Hasegawa, Nagoya (JP); Tomoaki Umeki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/961,296

(22) Filed: Oct. 6, 2022

(65) Prior Publication Data
US 2023/0026281 A1    Jan. 26, 2023

Related U.S. Application Data

(63) Continuation of application No. 16/812,483, filed on Mar. 9, 2020, now Pat. No. 11,491,992.

(30) Foreign Application Priority Data

Apr. 2, 2019    (JP) ................. 2019-070776

(51) Int. Cl.
*B60W 40/06* (2012.01)
*B60R 11/04* (2006.01)
*G06V 20/56* (2022.01)

(52) U.S. Cl.
CPC ............ *B60W 40/06* (2013.01); *B60R 11/04* (2013.01); *G06V 20/588* (2022.01);
(Continued)

(58) Field of Classification Search
CPC ............ B60W 40/06; B60W 2552/53; B60W 2556/10; B60R 11/04; B60R 2300/80; G06V 20/588
See application file for complete search history.

(56) References Cited

U.S. PATENT DOCUMENTS

| 2009/0088978 A1* | 4/2009 | Ishikawa .......... G08G 1/096725 701/514 |
| 2013/0033603 A1* | 2/2013 | Suzuki ............. G08G 1/096775 348/148 |

(Continued)

FOREIGN PATENT DOCUMENTS

| CN | 107895151 A | 4/2018 |
| JP | 2002-357557 A | 12/2002 |

(Continued)

OTHER PUBLICATIONS

U.S. Appl. No. 16/812,483, filed Mar. 9, 2020 in the name of Kazuaki Takemura et al.
Apr. 29, 2022 Office Action issued in U.S. Appl. No. 16/812,483.

*Primary Examiner* — Kenneth J Malkowski
(74) *Attorney, Agent, or Firm* — Oliff PLC

(57) ABSTRACT

A road abnormality detection apparatus includes: a memory; and a processor having hardware, wherein the processor is configured to: receive, from a traveling vehicle, a road image indicating an image of a surface of a road or a periphery of the road and image capturing position information indicating a position where the road image is captured; recognize a road facility included in the road image and a position of the road facility based on the road image and the image capturing position information; determine whether or not abnormality exists in the road facility by comparing the road facility included in the road image and correctness information that is prepared in advance; and accumulate, in the memory, facility position information
(Continued)

indicating the position of the road facility that the abnormality exists in when it is determined that the abnormality exists in the road facility.

20 Claims, 4 Drawing Sheets

(52) U.S. Cl.
CPC ...... *B60R 2300/80* (2013.01); *B60W 2552/53* (2020.02); *B60W 2556/10* (2020.02)

(56) References Cited

U.S. PATENT DOCUMENTS

| | | |
|---|---|---|
| 2018/0060986 A1 | 3/2018 | Suzuki et al. |
| 2018/0114299 A1 | 4/2018 | Hattori et al. |
| 2018/0362048 A1 | 12/2018 | Juno |

FOREIGN PATENT DOCUMENTS

| | | |
|---|---|---|
| JP | 2013-156835 A | 8/2013 |
| JP | 2014-164492 A | 9/2014 |
| JP | 2016-151967 A | 8/2016 |
| JP | 2017-020303 A | 1/2017 |
| JP | 2017-181168 A | 10/2017 |
| JP | 2018-072893 A | 5/2018 |

* cited by examiner

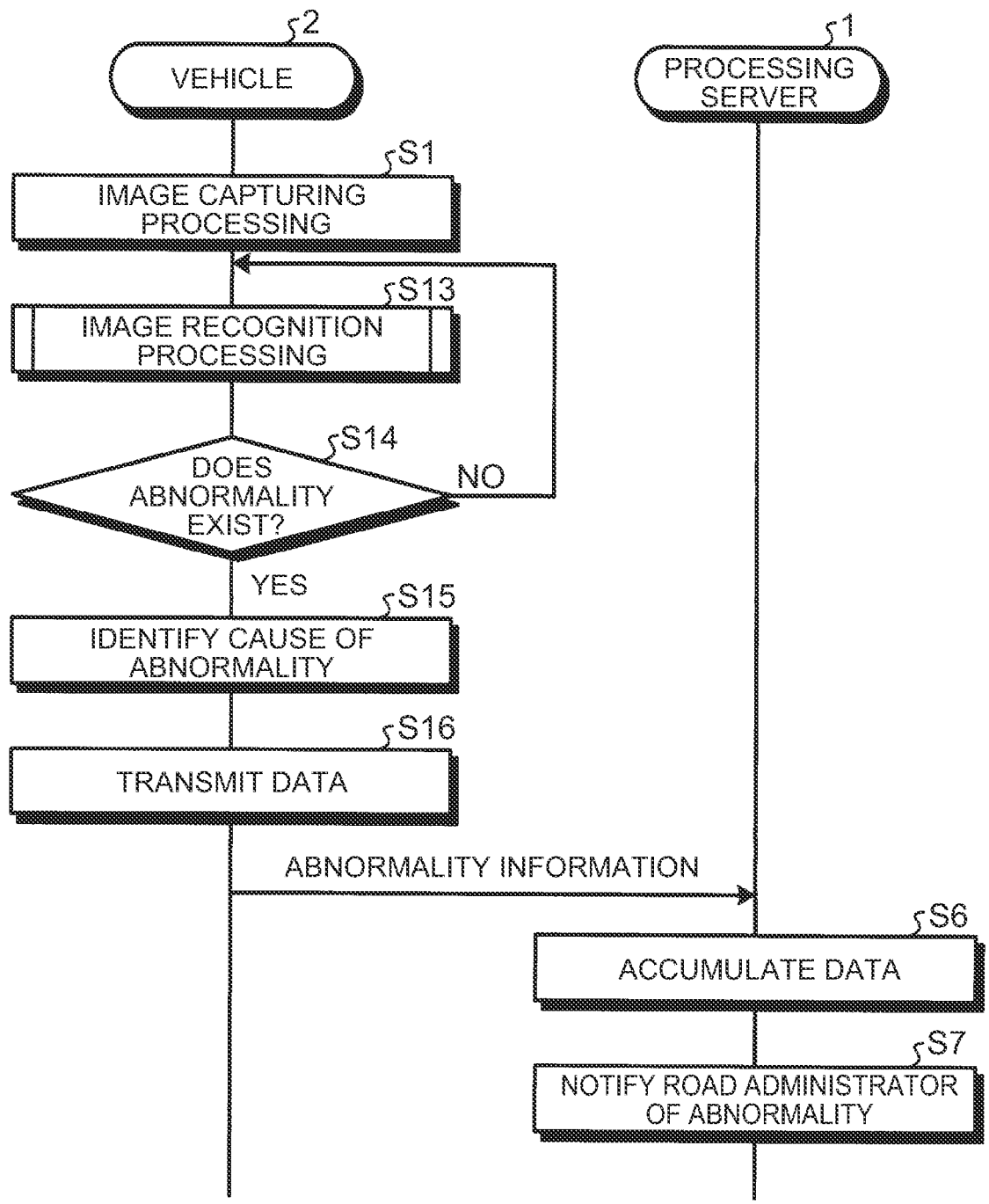

ROAD ABNORMALITY DETECTION APPARATUS, ROAD ABNORMALITY DETECTION METHOD AND ROAD ABNORMALITY DETECTION PROGRAM

CROSS-REFERENCE TO RELATED APPLICATION(S)

This application is a continuation of U.S. application Ser. No. 16/812,483 filed Mach 9, 2020, which is based on and claims priority under 35 U.S.C. 119 from Japanese Patent Application No. 2019-070776 filed on Apr. 2, 2019. The entire contents of the above applications are incorporated herein by reference.

BACKGROUND

1. Technical Field

The present disclosure relates to a road abnormality detection apparatus, a road abnormality detection method and a road abnormality detection program.

2. Description of Related Art

Japanese Patent Application Publication No. 2017-20303 discloses a method of capturing an image of a road indication applied onto a road surface obliquely from the above, correcting the captured image into an overhead view through homographic transformation, and determining the state of degradation of the road indication from the corrected image.

SUMMARY

For example, in automated driving or traveling during which white lines and the like need to be detected (for example, single lane traveling), accuracy of the traveling lowers when some white lines are faint or fade away. Therefore, when abnormality exists in a road facility such as a white line, the abnormality needs to be early detected to repair the road facility. It has been difficult to early detect abnormality in a road facility with a technology as disclosed in JP 2017-020303 A.

The present disclosure is devised in view of the above, and an object thereof is to provide a road abnormality detection apparatus, a road abnormality detection method and a road abnormality detection program capable of early detecting abnormality in a road facility.

In order to solve the problem above and achieve the object, there is provided a road abnormality detection apparatus according to the present disclosure, including: a memory; and a processor having hardware, wherein the processor is configured to: receive, from a traveling vehicle, a road image indicating an image of the surface of a road or the periphery of the road and image capturing position information indicating a position where the road image is captured; recognize a road facility included in the road image and a position of the road facility based on the road image and the image capturing position information; determine whether or not abnormality exists in the road facility by comparing the road facility included in the road image and correctness information that is prepared in advance with each other; and accumulate, in the memory, facility position information indicating the position of the road facility that the abnormality exists in when it is determined that the abnormality exists in the road facility.

Thereby, the road abnormality detection apparatus can early detect whether or not the abnormality exists in the road facility by performing image recognition processing on the road image received from the traveling vehicle.

Moreover, as to the road abnormality detection apparatus according to the present disclosure, in the disclosure above, the processor may recognize the road facility included in the road image by comparing pixel values of adjacent pixels in the road image with each other.

Thereby, the road abnormality detection apparatus can recognize the road facility included in the road image by comparing the pixel values of the adjacent pixels with each other, such, for example, as brightness values of the pixels when performing image processing on the road image.

Moreover, as to the road abnormality detection apparatus according to the present disclosure, in the disclosure above, the processor may accumulate, in the memory, the road image including the road facility in which the abnormality exists in addition to the facility position information of the road facility in which the abnormality exists, when it is determined that the abnormality exists in the road facility.

Thereby, the road abnormality detection apparatus can examine details of the abnormality arising in the road facility by collecting the image of the road facility in which the abnormality exists in addition to the position of the road facility.

Moreover, as to the road abnormality detection apparatus according to the present disclosure, in the disclosure above, the processor may transmit the facility position information to a server that a road administrator manages, when at least a predetermined quantity of the facility position information regarding the identical road facility has been accumulated in the memory.

Thereby, the road abnormality detection apparatus can notify the road administrator side of the position of the road facility in which abnormality exists, and thereby, the road facility can be early repaired.

Moreover, as to the road abnormality detection apparatus according to the present disclosure, in the disclosure above, the road facility may include a road indication presented on the road and a structure provided on the road or around the road.

Thereby, the road abnormality detection apparatus can early detect the abnormality arising in the road indication presented on the road and the structure provided on the road or around the road.

In order to solve the problem above and achieve the object, there is provided a road abnormality detection method according to the present disclosure which is a road abnormality detection method performed by a road abnormality detection apparatus including a processor. The road abnormality detection method includes: receiving, by the processor, from a traveling vehicle, a road image indicating an image of a surface of a road or a periphery of the road and image capturing position information indicating a position where the road image is captured; recognizing, by the processor, a road facility included in the road image and a position of the road facility based on the road image and the image capturing position information; determining, by the processor, whether or not abnormality exists in the road facility by comparing the road facility included in the road image and correctness information that is prepared in advance with each other; and accumulating, by the processor, in a memory of the road abnormality detection apparatus, facility position information indicating the position of the road facility that the abnormality exists in when it is determined that the abnormality exists in the road facility.

Thereby, the road abnormality detection method can early detect whether or not the abnormality exists in the road facility by performing image recognition processing on the road image received from the traveling vehicle.

In order to solve the problem above and achieve the object, there is provided a road abnormality detection program according to the present disclosure which is a road abnormality detection program executed by a road abnormality detection apparatus, the program comprising: receiving, from a traveling vehicle, a road image indicating an image of a surface of a road or a periphery of the road and image capturing position information indicating a position where the road image is captured; recognizing a road facility included in the road image and a position of the road facility based on the road image and the image capturing position information; determining whether or not abnormality exists in the road facility by comparing the road facility included in the road image and correctness information that is prepared in advance with each other; and accumulating, in a memory of the road abnormality detection apparatus, facility position information indicating the position of the road facility that the abnormality exists in when it is determined that the abnormality exists in the road facility.

Thereby, the road abnormality detection program can early detect whether or not the abnormality exists in the road facility by performing image recognition processing on the road image received from the traveling vehicle.

According to the present disclosure, abnormality in a road facility can be early detected based on a road image collected from a traveling vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart showing a modification of the processing procedure of the road abnormality detection method according to the embodiment of the present disclosure.

DETAILED DESCRIPTION OF EMBODIMENTS

A road abnormality detection apparatus, a road abnormality detection method and a road abnormality detection program according to an embodiment are described with reference to the drawings. Notably, constituents in the embodiment below may include those that can be easily replaced by a person skilled in the art, or those that are substantially identical to these.

Road Abnormality Detection System

Figure 1:
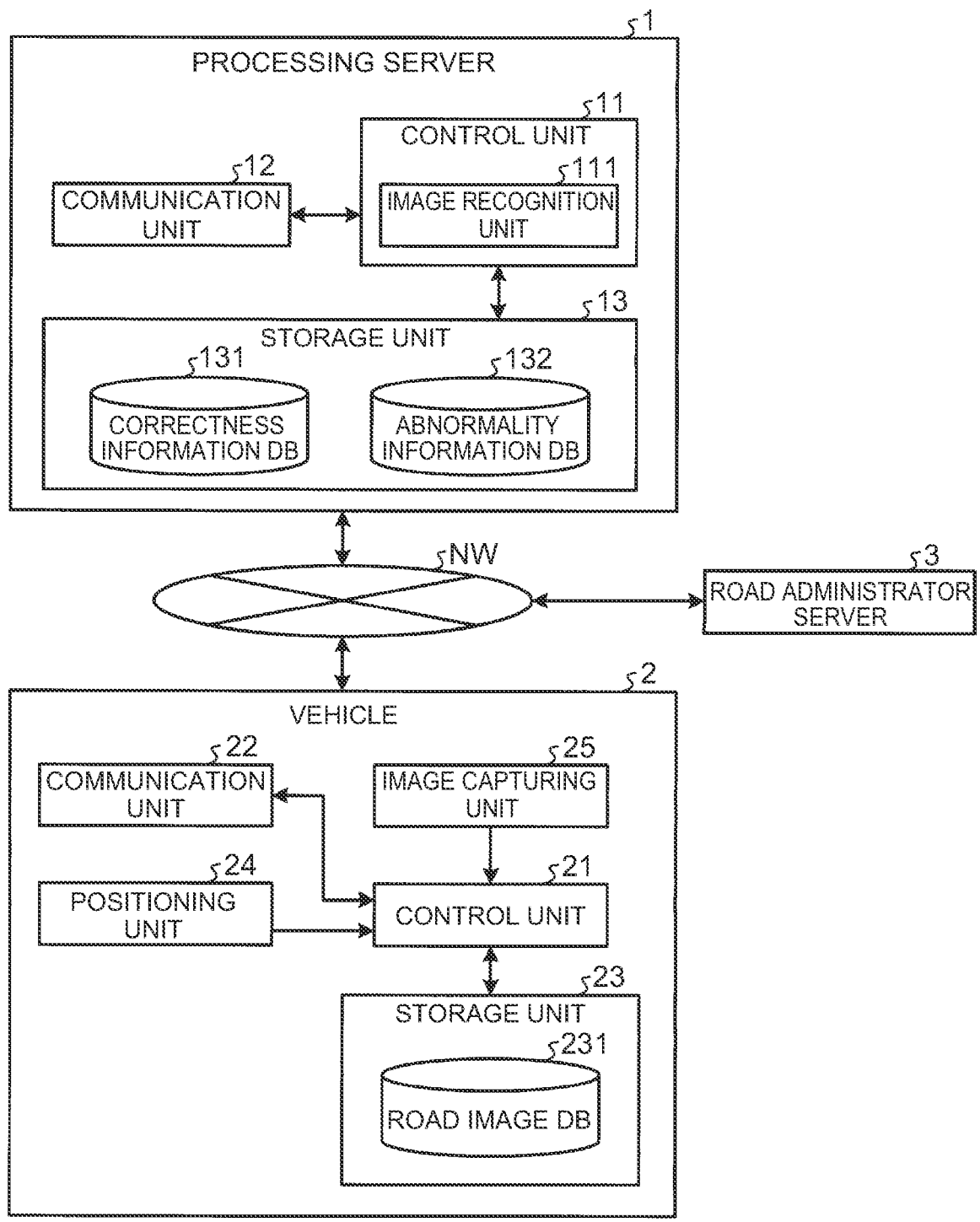
FIG. 1 is a block diagram schematically showing a road abnormality detection system to which a road abnormality detection apparatus according to an embodiment of the present disclosure can be applied.

First, a road abnormality detection system to which a road abnormality detection apparatus according to an embodiment can be applied is described with reference to FIG. 1.

The road abnormality detection system has a processing server 1, at least one vehicle 2 and a road administrator server 3. The road abnormality detection apparatus according to the present embodiment is configured, specifically, of the processing server 1. Moreover, the at least one vehicle 2 may be one vehicle 2 or a plurality of vehicles 2 traveling on a road.

The processing server 1, the vehicle 2 and the road administrator server 3 can communicate with one another via a network NW. The network NW is configured, for example, of any of the Internet network, a mobile phone network and the like.

Processing Server

Next, a configuration of the processing server 1 is described with reference to FIG. 1 and FIG. 2. The processing server 1 processes an image received from the vehicle 2 (road image) and includes a control unit 11, a communication unit 12 and a storage unit 13.

Specifically, the control unit 11 includes a processor composed of a central processing unit (CPU), a digital signal processor (DSP), a field-programmable gate array (FPGA) and the like, and a memory composed of a random access memory (RAM), a read-only memory (ROM) and the like (main storage unit), these omitted from the figure.

The control unit 11 loads a program stored in the storage unit 13 into a working area of the main storage unit to execute it, controls components and the like through the execution of the program, and thereby, realizes functions which meet predetermined purposes. The control unit 11 functions as an image recognition unit 111 through the execution of the program. Notably, details of the image recognition unit 111 are mentioned later.

The communication unit 12 is configured, for example, of a local area network (LAN) interface board, a wireless communication circuit for wireless communication, and the like. The communication unit 12 is connected to the network NW such as the Internet which is a public communication network. The communication unit 12 communicates with the processing server 1 and the road administrator server 3 through the connection to the network NW.

The storage unit 13 is configured of an erasable programmable ROM (EPROM), a hard disk drive (HDD), and a recording medium such as a removable medium. Examples of the removable medium include a universal serial bus (USB) memory, and disc recording media such as a compact disc (CD), a digital versatile disc (DVD) and a Blu-ray® disc (BD). Moreover, the storage unit 13 can store an operating system (OS), various programs, various tables, various databases and the like.

The storage unit 13 includes a correctness information DB 131 and an abnormality information DB 132. These databases (DBs) are built by a program for a database management system (DBMS) being executed by the processor above and managing data stored in the storage unit 13.

The correctness information DB 131 is configured, for example, of a relational database in which a plurality of pieces of correctness information are retrievably stored. The correctness information is information as a standard for determining whether or not abnormality exists in a road facility included in a road image transmitted from the vehicle 2.

Herein, the term "road image" denotes an image obtained by imaging a surface of a road or a periphery of the road. Moreover, "road facility" includes road indications presented on the road and structures provided on the road and around the road.

Figure 2:
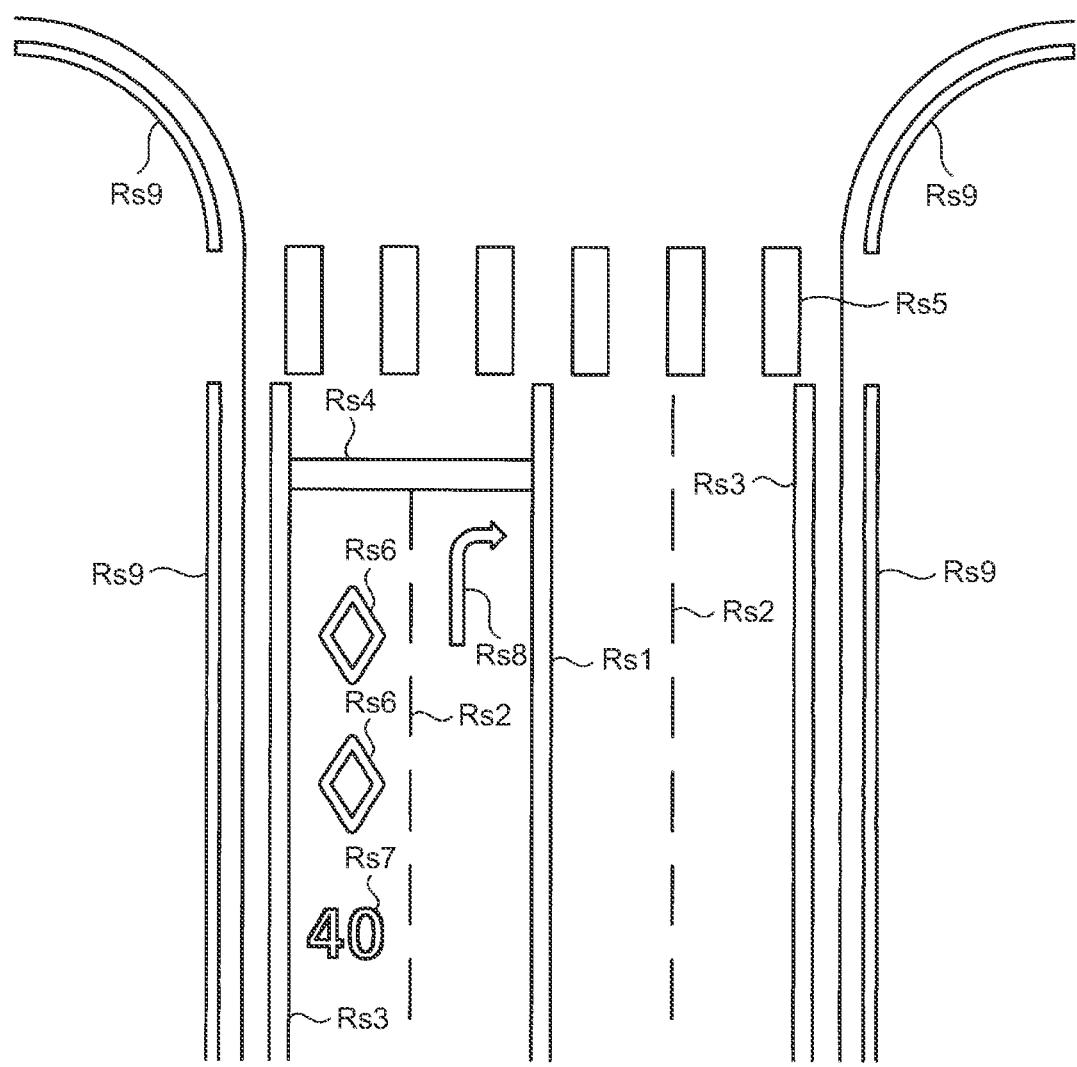
FIG. 2 is a schematic diagram exemplarily showing road facilities which are targets of the road abnormality detection apparatus according to the embodiment of the present disclosure.

Examples of the "road indications" above include a center line Rs1 composed of a solid line, center lines Rs2 composed of broken lines, outer lines Rs3, a stop line Rs4, a pedestrian crossing Rs5, pedestrian crossing advance notices Rs6, a speed limit indication Rs7, a right turn arrow Rs8 and the like as shown in FIG. 2, and road division lines and the like such as Botts' dots provided on roads in foreign countries.

Examples of the "structures" above include guardrails Rs9 provided around the road, and road signs such as an information sign, a warning sign, a regulatory sign and a direction sign. Notably, not limited to those shown in the figure, such road indications and structures include all the things installed on roads or around the roads in conformity with traffic regulations and the like.

The correctness information stored in the correctness information DB 131 is exemplarily information including types of road facilities which are to be at the site of the vehicle, and shapes and the like of the road facilities, and is stored therein as map information and various kinds of information such as image data. These pieces of correctness information are built as the correctness information DB 131 by the control unit 11 externally collecting those via the network NW and/or an operator manually inputting those. Notably, how to collect the correctness information is not limited to any of these methods for collecting the same.

The abnormality information DB 132 is configured, for example, of a relational database in which a plurality of pieces of abnormality information are retrievably stored. The abnormality information is information regarding a road facility in which abnormality exists, and as mentioned later, for example, includes facility position information indicating a position of a road facility in which abnormality exists, a road image including the road facility, and the cause of the abnormality of the road facility.

Vehicle

Next, a configuration of the vehicle 2 is described with reference to FIG. 1. The vehicle 2 is a movable body externally communicable and includes a control unit 21, a communication unit 22, a storage unit 23, a positioning unit 24 and an image capturing unit 25. The control unit 21 and the storage unit 23 are physically similar to the control unit 11 and the storage unit 13 above, respectively.

The control unit 21 integrally controls operation of various components mounted on the vehicle 2. Moreover, the control unit 21 stores, in the storage unit 23, positional information of the vehicle 2 input from the positioning unit 24 in association with a road image input from the image capturing unit 25. Namely, the control unit 21 stores, in the storage unit 23, image capturing position information indicating a position where the road image is captured by the image capturing unit 25 in association with the road image thus captured.

The communication unit 22 is configured, for example, of a data communication module (DCM) and the like, and communicates with the processing server 1 through wireless communication via the network NW. The storage unit 23 includes a road image DB 231. The road image DB 231 is exemplarily a relational database (RDB) in which road images captured by the image capturing unit 25 are retrievably stored. Notably, these road images are associated with the image capturing position information.

The positioning unit 24 receives electric waves from global positioning system (GPS) satellites (not shown) to detect a current position of the vehicle 2. Then, the positioning unit 24 outputs information regarding the detected current position of the vehicle 2 (hereinafter called "vehicle position information") to the control unit 21. Notably, there can also be used as a method of detecting the current position of the vehicle 2 a method, for example, having light detection and ranging (LiDAR, laser imaging detection and ranging) and a three-dimensional digital map combined.

The image capturing unit 25 is an image capturing camera or the like, for example, attached to a front portion of a body of the vehicle 2, captures a road image frontward of the vehicle 2 while the vehicle 2 is traveling, and outputs the captured road image to the control unit 21. Notably, the "road image" may be any of still image data and moving image data, or may be moving image data generated using a plurality of chronologically continuous still image data.

Road Administrator Server

Next, a configuration of the road administrator server 3 is described with reference to FIG. 1. The road administrator server 3 is a server managed by a road administrator. The road administrator is an entity liable to repair of the road facilities, and examples thereof include local public entities such as the twenty-three wards of Tokyo, prefectures, cities, towns and villages, the Public Safety Commission, and the like.

Road Abnormality Detection Method

Next, a road abnormality detection method performed by the road abnormality detection apparatus is described with reference to FIG. 3.

First, the vehicle 2 captures an image of a road in its traveling with the image capturing unit 25 (step S1). Subsequently, the vehicle 2 transmits the captured road image and the image capturing position information of the road image to the processing server 1 periodically in predetermined timing (step S2). Notably, there can be set as such predetermined timing, for example, various kinds of timing such as periodical timing at predetermined time intervals, and timing when the vehicle 2 passes through predetermined positions.

Subsequently, after receiving the road image and the image capturing position information from the vehicle 2, the processing server 1 performs image recognition processing on the road image with the image recognition unit 111 (step S3). The image recognition unit 111 recognizes a road facility included in the road image and a position of the road facility based on the road image and the image capturing position information using a known image recognition processing technique. Notably, the term "position of the road facility" denotes coordinates (longitude; latitude) where the road facility is installed.

Specifically, the image recognition unit 111 compares pixel values of adjacent pixels in the road image with one another, such, for example, as brightness values of the pixels, and thereby, recognizes a type of the road facility included in the road image. Moreover, the image recognition unit 111 recognizes the position of the road facility included in the road image, for example, by a method of estimating a depth distance to that road facility or the similar method.

Subsequently, the image recognition unit 111 determines whether or not abnormality exists in the road facility (step S4). Specifically, the image recognition unit 111 determines whether or not abnormality exists in the road facility included in the road image by comparing the road facility and the correctness information which is prepared in advance and stored in the correctness information DB 131 with each other.

When it is determined in step S4 that no abnormality exists in the road facility (No in step S4), the image recognition unit 111 returns the process to step S3. On the other hand, when it is determined in step S4 that abnormality exists in the road facility (Yes in step S4), the image recognition unit 111 identifies the cause of the abnormality (step S5).

There can be herein considered as abnormality in road facilities, breakage, abrasion, spots due to dirt, deposits of withered leaves, litter or the like, and the like. It is herein supposed, for example, that the road facility is the center line Rs1 drawn in the center of the road (see FIG. 2). In this case, when the center line Rs1 is damaged and "existence of abnormality" is determined in step S4, the image recognition unit 111 identifies a reason for the abnormality, for example, as any of breakage, abrasion, spots due to dirt, and withered leaves, litter or the like using a known image recognition processing technique.

Subsequently, the control unit 11 of the processing server 1 accumulates data of an image recognition processing result (step S6). In this step, the control unit 11 stores, in the abnormality information DB 132 of the storage unit 13, facility position information at least indicating a position of the road facility in which the abnormality exists as abnormality information. Moreover, in this step, the control unit 11 may store, in the abnormality information DB 132, the road image including the road facility in which the abnormality exists and the cause of the abnormality of the road facility as the abnormality information in addition to the facility position information of the road facility in which the abnormality exists. As above, by collecting the image of the road facility in which the abnormality exists and the cause of the abnormality in addition to the position of the road facility, there can be examined details of the abnormality arising in the road facility.

Subsequently, the control unit 11 notifies the road administrator that the abnormality arises in the road facility (step S7). Specifically, the control unit 11 notifies the road administrator that the abnormality arises in the road facility by transmitting the abnormality information accumulated in the abnormality information DB 132 to the road administrator server 3. Notably, the abnormality information transmitted to the road administrator server 3 at least includes the facility position information of the road facility in which the abnormality exists, and may include the road image including the road facility in which the abnormality exists and the cause of the abnormality of the road facility. By notifying the road administrator side of the position of the road facility in which the abnormality exists as above, the road facility can be early repaired.

Notably, the control unit 11 may transmit the abnormality information to the road administrator server 3 when a predetermined quantity of abnormality information regarding the identical road facility has been accumulated in the abnormality information DB 132. Namely, the control unit 11 may notify the road administrator that the abnormality arises in the road facility only when the image recognition processing (see step S4) is performed on road images including the identical road facility which are captured, for example, by a plurality of vehicles 2 and "existence of abnormality" is determined for all of those. Thereby, the road administrator can be notified that the abnormality arises in the road facility only in a case of a high possibility that the abnormality arises in the road facility.

According to the road abnormality detection apparatus, the road abnormality detection method and the road abnormality detection program according to the embodiment as described above, it can early detect whether or not abnormality exists in a road facility by performing image recognition processing on a road image received from the traveling vehicle 2. Moreover, according to the road abnormality detection apparatus, the road abnormality detection method and the road abnormality detection program according to the embodiment, since road images can be collected from the plurality of vehicles 2 and it can be determined whether or not abnormality exists in road facilities included in the road images, it can early detect whether or not abnormality exists in the road facilities widely installed. Moreover, according to the road abnormality detection apparatus, the road abnormality detection method and the road abnormality detection program according to the embodiment, for example, abnormality information of road facilities can be sold to a road administrator in charge of repair of roads (any of local public entities, the Public Safety Commission, and the like).

Modification

Figure 3:
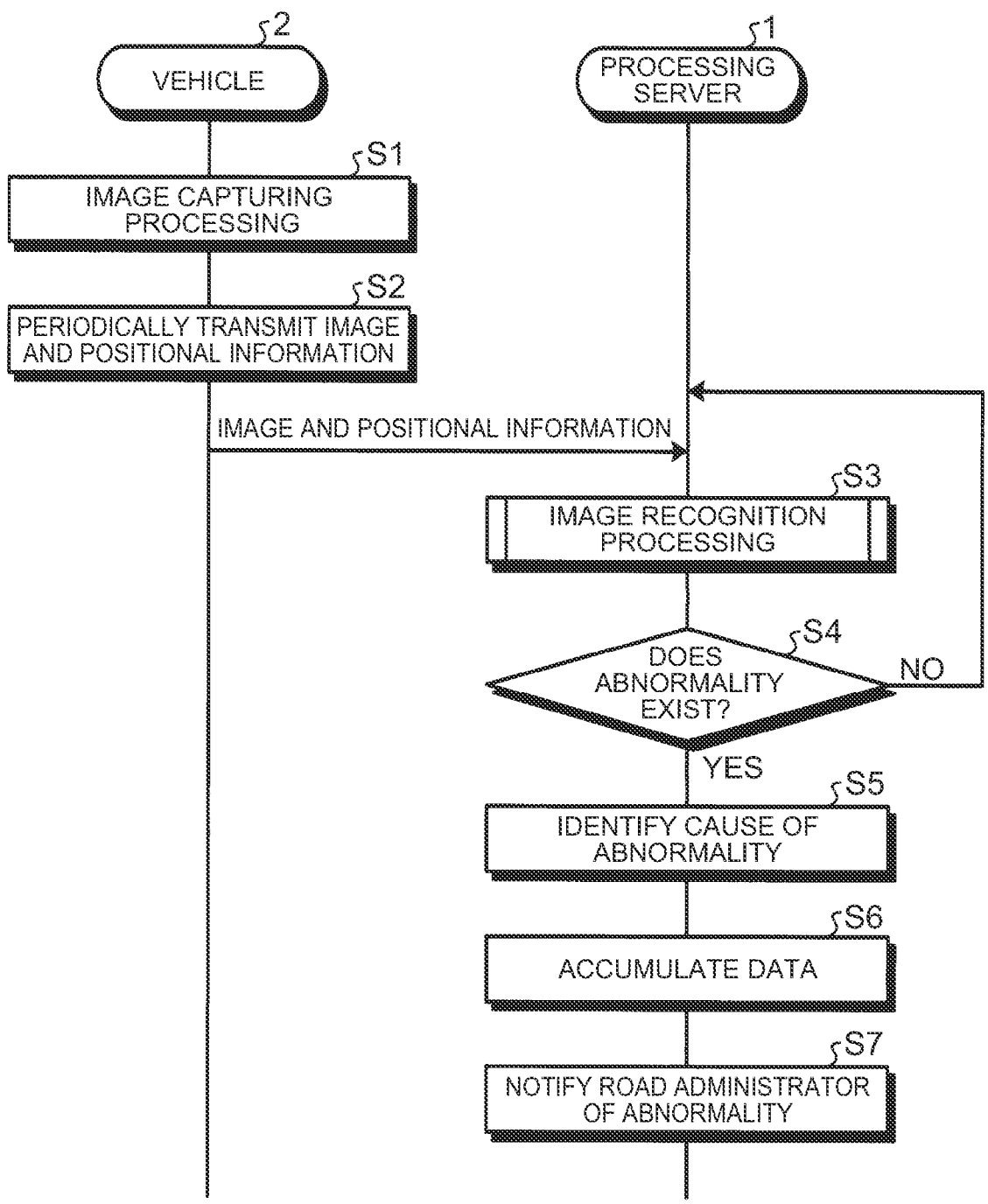
FIG. 3 is a flowchart showing a processing procedure of a road abnormality detection method according to the embodiment of the present disclosure.

While in the road abnormality detection method described with FIG. 3, the vehicle 2 side only captures road images and the processing server 1 side performs image recognition processing thereon, the vehicle 2 side can also perform the image recognition processing. Hereafter, a modification of the road abnormality detection method according to the embodiment is described with reference to FIG. 4. Notably, the contents in steps S1, S6 and S7 in the figure are similar to the contents in steps S1, S6 and S7 of the road abnormality detection method described with FIG. 3 and their description is omitted.

Subsequently to step S1, the control unit 21 of the vehicle 2 performs image recognition processing on the road image (step S13). The control unit 21 recognizes a road facility included in the road image and a position of the road facility based on the road image and the image capturing position information using a known image recognition processing technique.

Specifically, the control unit 21 compares pixel values of adjacent pixels in the road image with one another, such, for example, as brightness values of the pixels, and thereby, recognizes a type of the road facility included in the road image. Moreover, the control unit 21 recognizes the position of the road facility included in the road image, for example, by a method of estimating a depth distance to that road facility or the similar method.

Subsequently, the control unit 21 determines whether or not abnormality exists in the road facility (step S14). Specifically, the control unit 21 determines whether or not abnormality exists in the road facility included in the road image based on the road facility and the correctness information which is prepared in advance. Notably, the correctness information above may be stored in the storage unit 23 of the vehicle 2 in advance or may be acquired every time from the correctness information DB 131 of the processing server 1.

When it is determined in step S14 that no abnormality exists in the road facility (No in step S14), the control unit 21 returns the process to step S13. On the other hand, when it is determined in step S14 that abnormality exists in the road facility (Yes in step S14), the control unit 21 identifies the cause of the abnormality (step S15).

Subsequently, the control unit 21 transmits data of an image recognition processing result to the processing server 1 (step S16). In this step, the control unit 21 transmits the facility position information at least indicating a position of the road facility in which the abnormality exists as the abnormality information to the processing server 1. Moreover, in this step, the control unit 21 may transmit the road image including the road facility in which the abnormality exists and the cause of the abnormality of the road facility as the abnormality information to the processing server 1 in addition to the facility position information of the road facility in which the abnormality exists.

According to the modification as to the road abnormality detection apparatus, the road abnormality detection method and the road abnormality detection program according to the embodiment as described above, load on the processing server 1 side can be reduced by the vehicle 2 side performing image recognition processing.

As above, a road abnormality detection apparatus, a road abnormality detection method and a road abnormality detection program according to the present disclosure have been described specifically with a mode for carrying out the disclosure. The scope of the present disclosure is not limited by such description but should be broadly construed based on the disclosure in the appended claims. It is needless to say that the scope of the present disclosure includes various alterations, modifications and the like based on such description.

Further effects and modifications can be easily derived by those skilled in the art. Thus, the broader aspects of the present disclosure are not limited to the specific details and representative embodiment shown and described above. Accordingly, various modifications can be made without departing from the spirit or scope of the general inventive concept as defined by the appended claims and their equivalents.

What is claimed is:

1. A road abnormality detection apparatus comprising:
a memory; and
a hardware processor programmed to:
receive, from a traveling vehicle, (i) a road image indicating an image of at least a surface of a road, the road image being captured by a camera attached to the vehicle and (ii) image capturing position information indicating a position where the road image is captured, the position being detected by a positioning unit of the vehicle using GPS data or laser imaging data;
recognize a road indication presented on the surface of the road included in the road image and a position of the road indication based on the road image and the image capturing position information;
determine that an abnormality exists in the road indication by using the road image; and
when determining that the abnormality exists in the road indication, identify a cause of the abnormality, wherein
the road indication includes at least one of a center line on the surface of the road, an outer line on the surface of the road, a stop line on the surface of the road, a pedestrian crossing indication on the surface of the road, a speed limit indication on the surface of the road, an arrow line on the surface of the road, and a road division line on the surface of the road, and
in response to determining that the abnormality exists in the same road indication a plurality of times based on a plurality of the road images captured by a plurality of the vehicles, the processor is programmed to transmit indication position information for repair of the road indication and the cause of the abnormality.

2. The road abnormality detection apparatus according to claim 1, wherein the processor recognizes the road indication included in the road image by comparing pixel values of adjacent pixels in the road image with each other.

3. The road abnormality detection apparatus according to claim 1, wherein the processor accumulates, in the memory, the indication position information and the cause of the abnormality in response to determining that the abnormality exists in the road indication.

4. The road abnormality detection apparatus according to claim 3, wherein the processor accumulates, in the memory, the road image including the road indication in which the abnormality exists in addition to the indication position information of the road indication in which the abnormality exists, in response to determining that the abnormality exists in the road indication.

5. The road abnormality detection apparatus according to claim 1, wherein
the processor determines that the abnormality exists in the road indication by comparing the road indication included in the road image with correctness information that is prepared in advance.

6. The road abnormality detection apparatus according to claim 5, wherein
the correctness information includes map information having road indication information prepared in advance.

7. A road abnormality detection method performed by a road abnormality detection apparatus including a memory and a hardware processor, the road abnormality detection method comprising:
receiving, by the processor, from a traveling vehicle, (i) a road image indicating an image of at least a surface of a road, the road image being captured by a camera attached to the vehicle and (ii) image capturing position information indicating a position where the road image is captured, the position being detected by a positioning unit of the vehicle using GPS data or laser imaging data;
recognizing, by the processor, a road indication presented on the surface of the road included in the road image and a position of the road indication based on the road image and the image capturing position information;
determining, by the processor, that an abnormality exists in the road indication by using the road image;
when determining that the abnormality exists in the road indication, identifying a cause of the abnormality; and
in response to determining that the abnormality exists in the same road indication a plurality of times based on a plurality of the road images captured by a plurality of the vehicles, transmitting, by the processor, indication position information for repair of the road indication and the cause of the abnormality, wherein
the road indication includes at least one of a center line on the surface of the road, an outer line on the surface of the road, a stop line on the surface of the road, a pedestrian crossing indication on the surface of the road, a speed limit indication on the surface of the road, an arrow line on the surface of the road, and a road division line on the surface of the road.

8. The road abnormality detection method according to claim 7, wherein the processor recognizes the road indication included in the road image by comparing pixel values of adjacent pixels in the road image with each other.

9. The road abnormality detection method according to claim 7, wherein the processor accumulates, in the memory, the indication position information and the cause of the abnormality in response to determining that the abnormality exists in the road indication.

10. The road abnormality detection method according to claim 9, wherein the processor accumulates, in the memory, the road image including the road indication in which the abnormality exists in addition to the indication position information of the road indication in which the abnormality exists, in response to determining that the abnormality exists in the road indication.

11. The road abnormality detection method according to claim 7, wherein
the processor determines that the abnormality exists in the road indication by comparing the road indication included in the road image with correctness information that is prepared in advance.

12. The road abnormality detection method according to claim 11, wherein
the correctness information includes map information having road indication information prepared in advance.

13. A non-transitory computer-readable medium storing thereon a road abnormality detection program executed by a road abnormality detection apparatus including a memory and a hardware processor, the program causing the processor to execute:
receiving, from a traveling vehicle, (i) a road image indicating an image of at least a surface of a road, the road image being captured by a camera attached to the vehicle and (ii) image capturing position information indicating a position where the road image is captured, the position being detected by a positioning unit of the vehicle using GPS data or laser imaging data;
recognizing a road indication presented on the surface of the road included in the road image and a position of the road indication based on the road image and the image capturing position information;
determining that an abnormality exists in the road indication by using the road image;
when determining that the abnormality exists in the road indication, identifying a cause of the abnormality; and
in response to determining that the abnormality exists in the same road indication a plurality of times based on a plurality of the road images captured by a plurality of the vehicles, transmitting indication position information for repair of the road indication and the cause of the abnormality, wherein
the road indication includes at least one of a center line on the surface of the road, an outer line on the surface of the road, a stop line on the surface of the road, a pedestrian crossing indication on the surface of the road, a speed limit indication on the surface of the road, an arrow line on the surface of the road, and a road division line on the surface of the road.

14. The non-transitory computer-readable medium according to claim 13, wherein the program causes the processor to recognize the road indication included in the road image by comparing pixel values of adjacent pixels in the road image with each other.

15. The non-transitory computer-readable medium according to claim 13, wherein the program causes the processor to accumulate, in the memory, the indication position information and the cause of the abnormality in response to determining that the abnormality exists in the road indication.

16. The non-transitory computer-readable medium according to claim 15, wherein the program causes the processor to accumulate, in the memory, the road image including the road indication in which the abnormality exists in addition to the indication position information of the road indication in which the abnormality exists, in response to determining that the abnormality exists in the road indication.

17. The non-transitory computer-readable medium according to claim 13, wherein the program causes the processor to determine that the abnormality exists in the road indication by comparing the road indication included in the road image with correctness information that is prepared in advance.

18. The non-transitory computer-readable medium according to claim 17, wherein the correctness information includes map information having road indication information prepared in advance.

19. The road abnormality detection apparatus according to claim 1, wherein the road indication includes Botts' dots.

20. The road abnormality detection apparatus according to claim 1, wherein the abnormalities in the road markings include spots due to dirt, deposits of withered leaves and litter.

* * * * *